Jan. 31, 1967  HIROSHI TADO  3,301,231
SEALING DEVICE FOR ROTARY PISTON ENGINES
Filed July 12, 1965
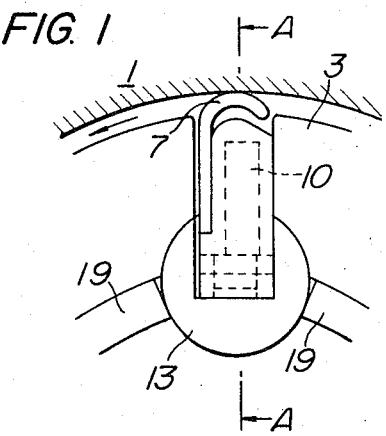
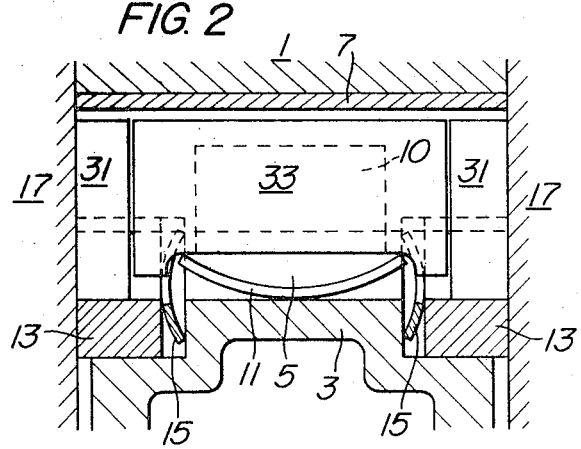
INVENTOR
Hiroshi Tado
BY Stevens, Davis, Miller & Mosher
ATTORNEYS 3,301,231
SEALING DEVICE FOR ROTARY PISTON ENGINES
Hiroshi Tado, Suita-shi, Japan, assignor to Yanmar Diesel Engine Co., Ltd., Kita-ku, Osaka, Japan, a corporation of Japan
Filed July 12, 1965, Ser. No. 471,102
Claims priority, application Japan, July 25, 1964, 39/58,635
1 Claim. (Cl. 123—8)

This invention relates to a rotary piston engine of the type having a piston rotably mounted on an eccentric portion of a crank shaft in a manner that upon rotation of the crank shaft the piston makes the so-called planetary motion, that is, the piston rotates at a fixed revolving rate about the eccentric portion and at the same time rotates about the axis of the crank shaft, and more particularly to a device adapted for sealing an apex portion of the piston in its axial direction comprising an axial slot bored through the apex portion of the piston, and an apex sealing assembly disposed in the axial slot in a manner that the sealing assembly is urged onto the inner face of the engine housing for making sliding contact therewith by a pressure applied from the high-pressure chamber to the bottom face of the sealing assembly.

The primary object of the present invention is the provision of a sealing device for a rotary piston engine of the type described above which includes side sealing members securely fixed to corner sealing bolts in order to minimize leakage of gas through axially opposite side faces of the apex sealing assembly during operation at low speed and when the axially opposite side faces have been worn away after long time operation to thereby prevent any lowering of engine output.

A preferred embodiment of the present invention will now be described hereinunder with reference to the accompanying drawings in which;

FIG. 1 is a front elevational view of an apex portion of a piston of a rotary piston engine, showing an apex sealing assembly embodying the present invention mounted therein for operation.

FIG. 2 is a sectional view taken on the line A—A in FIG. 1.

In FIG. 1 of the drawings, a piston 3 rotates in a housing 1 in the direction of arrow A, and a slot 5 extending in the direction of piston axis is provided in an angular or apex portion of the piston 3. A sliding strip 7 and a support block forming an apex sealing assembly are accommodated in the slot 5.

The support block is axially split into three sections, of which side block sections 31 are firmly fixed to respective corner sealing bolts 13 and are axially movable together with the respective corner sealing bolts 13. A corner sealing spring 15 urges each set of the side block section 31 and the corner sealing bolt 13 towards a side housing 17.

Side sealing members 19 are fitted on opposite side faces of the piston 3 in order to seal the side faces against leakage of gas therethrough. The sliding strip 7 of resiliently flexible material is brought into contact with a cut-out on the intermediate block section 33 for being supported thereby. An apex sealing spring 11 is interposed between the bottom of the intermediate block section 33 and the bottom of the piston slot 5 to urge the sliding strip 7 through the intermediate block section 33 towards the inner face of the engine housing for sliding contact therewith. Generally, the interior of the intermediate block section 33 may preferably be made hollow as at 10 to reduce its weight to thereby minimize the force of impact.

According to the sealing device of the present invention, axial wear in the apex sealing assembly merely results in an increase in the gaps between the side block sections 31 and the intermediate block section 33 and there is no possibility of any side gaps taking place, whereas in an apex sealing assembly of conventional design having a support block of unitary structure, axial wear therein results in gradual increase in side gaps and attendant increase in an amount of gas leakage. According to the present invention, leakage of gas through the gaps between the side block sections 31 and the intermediate block section 33 hardly takes place since these gaps are completely covered by the sliding strip 7 of sheet structure and thus leakage of gas through the axial gaps can be minimized.

What is claimed is:

In a rotary piston engine of the type having a piston rotably mounted on an eccentric portion of a crank shaft in a manner that upon rotation of the crank shaft said piston makes the so-called planetary motion, that is, said piston rotates at a fixed revolving rate about the eccentric portion and at the same time about the axis of the crank shaft, a sealing device comprising an axial slot bored through an apex of said piston and an apex sealing assembly disposed in said axial slot in said piston, said apex sealing assembly comprising a strip of resiliently flexible material having an arcuate head portion, a support block having a cut-out for securely supporting thereon said flexible strip brought into intimate contact therewith, and spring means disposed below said support block for urging said support block radially outwardly for thereby urging the head portion of said flexible strip onto the inner face of the engine housing to insure positive sliding contact therebetween, characterized in that said support block is axially split into three block sections and side block sections of said support block are firmly fixed to corner sealing bolts and urged onto a side housing by corner sealing springs.

References Cited by the Examiner
UNITED STATES PATENTS

| | | | |
|---|---|---|---|
| 723,656 | 3/1903 | Dunn | 123—8 |
| 3,103,920 | 9/1963 | Georges | 123—8 |
| 3,127,095 | 3/1964 | Froede | 123—8 |
| 3,130,900 | 4/1964 | Schlor | 230—145 |
| 3,176,909 | 4/1965 | Maurhoff | 230—145 |
| 3,251,541 | 5/1966 | Paschke | 230—145 |

DONLEY J. STOCKING, *Primary Examiner*
W. J. GOODLIN, *Assistant Examiner.*